Aug. 17, 1965     G. W. OFFENSEND     3,201,301
LAMINATED TAPE STRUCTURE

Filed Nov. 24, 1961     2 Sheets-Sheet 1

GLEN W. OFFENSEND
INVENTOR.

BY *R. Frank Smith*
*Lloyd F. Seebach*
ATTORNEY & AGENT

Aug. 17, 1965   G. W. OFFENSEND   3,201,301
LAMINATED TAPE STRUCTURE
Filed Nov. 24, 1961   2 Sheets-Sheet 2
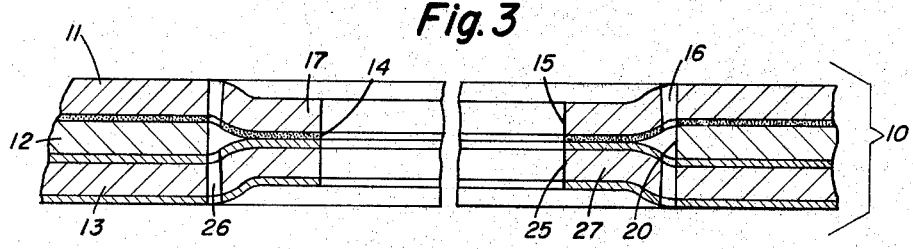
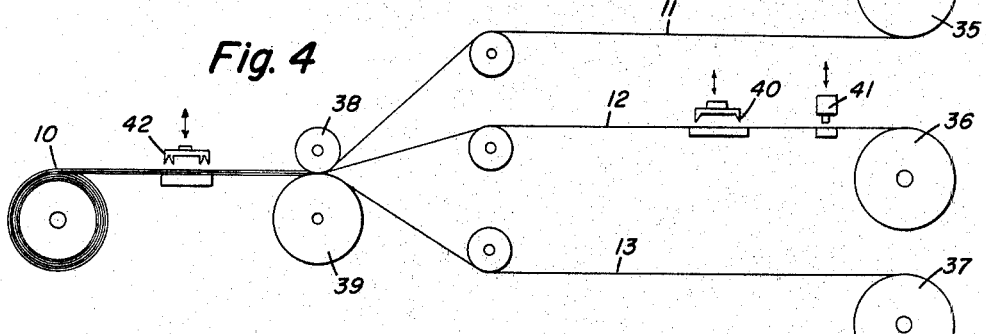
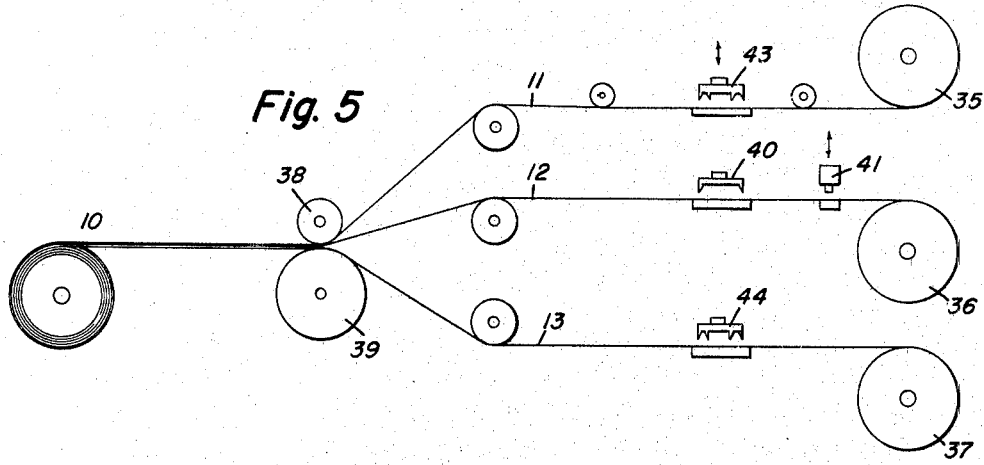
GLEN W. OFFENSEND
INVENTOR.
BY
ATTORNEY & AGENT 3,201,301
LAMINATED TAPE STRUCTURE
Glen W. Offensend, Rochester, N.Y., assignor to Eastman Kodak Company, Rochester, N.Y., a corporation of New Jersey
Filed Nov. 24, 1961, Ser. No. 154,448
11 Claims. (Cl. 161—112)

The invention relates to a laminated tape structure and particularly to a tape structure for handling and supporting sheets or frames of thin, pressure-sensitive adhesive material.

In the prior art, the cutting and transporting of sheets or frames of pressure-sensitive adhesive material presents a problem in that such sheets or frames are exceptionally thin, and, if unsupported, other means must be provided to ensure that the material does not buckle or deform in the cutting station. In the application of sheets or frames of pressure-sensitive adhesive material to record cards, as disclosed in U.S. Patent No. 2,588,087, the frames of pressure-sensitive adhesive material are conveyed in close proximity to the cutting station by a carrier tape which is peeled from the adhesive material just prior to entry of a sheet or frame into the cutting station. From the point at which the carrier tape is removed to the point at which the frame or sheet is positioned under the cutting knife, no support is provided for the frame or sheet and due to the fact that it is very thin, it is difficult to locate the material for accurate cutting and application with respect to the aperture in the card. These disadvantages of the prior art are overcome by the present invention in that the disclosed laminated tape structure provides a definite and relatively stiff support for the sheet or frame of pressure-sensitive adhesive at it is moved into a cutting or blanking station. This is accomplished by suspending the sheet or frame of pressure-sensitive material over an aperture in a carrier tape by means of bridges of the pressure-sensitive material which retain the frame or sheet integrally with the strip until it is actually cut therefrom.

The laminated tape structure disclosed and described in detail hereinafter comprises a first tape or strip of material having a pressure-sensitive adhesive on one surface thereof and a plurality of rectangular sheets formed therein by a pattern of discontinuous slits, said sheets being spaced longitudinally and retained in relation to the tape by bridges of the material arranged around the periphery of the sheet which are formed by said slits. A second or carrier tape is contiguous to the adhesive surface of the first tape and is provided with spaced apertures which are at least of the same size as the area defined by the slits in the first tape. In order to protect the adhesive surface exposed in the apertures of the second tape, a third tape or strip of material having an adhesive resistant agent on at least one surface thereof is arranged contiguous to the other surface of the second tape and in contact with the exposed adhesive surface. The latter tape can be provided with discontinuous slits in accordance with those in the first tape.

The primary object of the invention therefor is to provide a laminated tape structure which will support preformed sheets or frames during movement into a position for being cut from the tape from which they have been formed.

Another object of the invention is to provide a laminated tape structure in which a pressure-sensitive adhesive material, which is exposed in apertures in a carrier tape, is fully protected until the cover tape is removed.

Yet another object of the invention is to provide a laminated tape structure in which a pressure-sensitive material is fully protected and can be wound into roll form without adhering to adjacent convolutions.

And still another object of the invention is to provide a laminated tape structure in which individual sheets or frames of pressure-sensitive adhesive material are supported in relation to an aperture in a carrier tape for readily cutting the sheets or frames individually from the tape of pressure-sensitive material for application to individual articles.

Other objects and advantages will be apparent to those skilled in the art by the description which follows.

Reference is now made to the accompanying drawings wherein like reference numerals designate like parts and wherein:

FIG. 3 is an enlarged cross-section taken substantially along the line 3—3 of FIG. 2;

FIG. 4 is a diagrammatic representation of an arrangement for forming the laminated tape structure shown in FIG. 1; and FIG. 5 is a diagrammatic representation similar to FIG. 4 and showing another arrangement for forming the laminated tape structure shown in FIG. 1.

Figure 1:
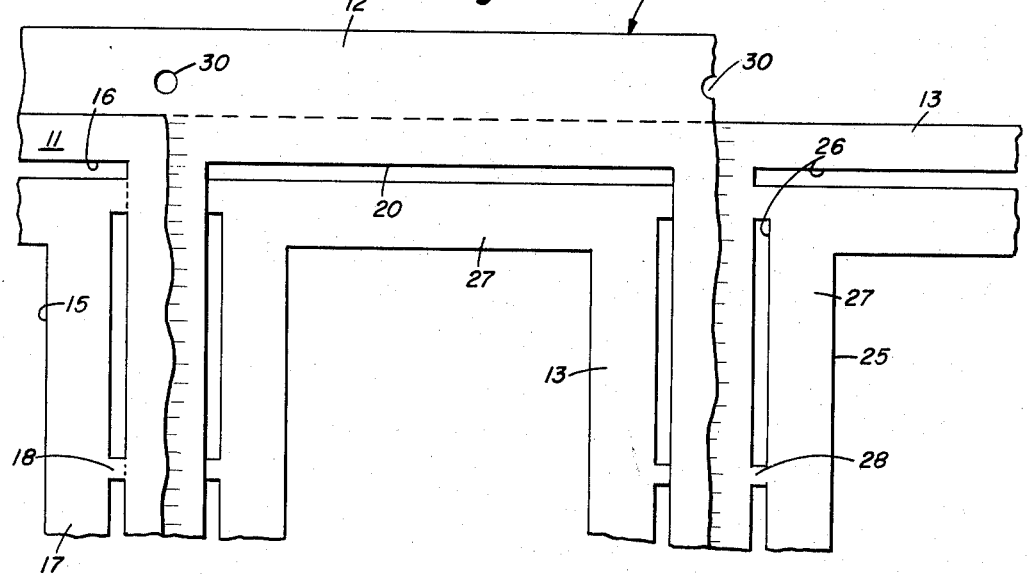
FIG. 1 is a partial elevation of a laminated tape structure showing the relation of the tape elements and the relation of the apertures and slits defining the frames or sheets.
Figure 2:
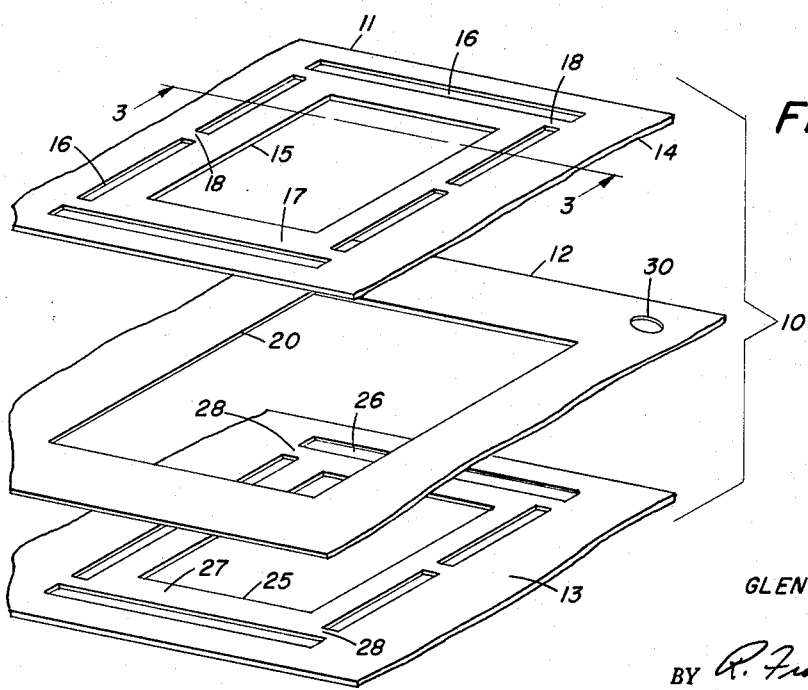
FIG. 2 is an exploded perspective view showing the relation of the tape elements shown in FIG. 1.

With reference particularly to FIG. 1, the laminated tape structure designated by the numeral 10 comprises a first strip of material or tape 11 which is a thin strip of transparent or opaque material, for example, a polyester film, such as Mylar. The second tape or strip of material 12 is a kraft paper and the adhesive protecting tape or strip of material 13 is a glassine paper. The relation of these tapes is shown in the grossly enlarged cross-section shown in FIG. 3. As shown in FIG. 3, the film or tape 11 is provided with an adhesive which is applied to one surface thereof and is preferably a pressure-sensitive adhesive. This adhesive surface 14 is contiguous to one of the surfaces of the kraft paper tape 12. While a glassine paper has been shown as forming the third element of the tape structure, any other thin material having an adhesive resistant agent on at least one surface thereof can be used in place of the glassine paper. The glassine paper tape 13 is then arranged contiguous to the other surface of the kraft paper tape 12 and if any other material is used, then the adhesive resistant agent surface must be contiguous to the other surface of the kraft paper.

The tape 11 is provided with an aperture 15 and with a group or pattern of discontinuous slits 16 which are spaced from the aperture 15 to provide, in effect, a frame 17. It will be noted that the slits 16 are discontinuous, and bridges of the pressure-sensitive material, which are designated by the numeral 18, retain the frame 17 in position with respect to the tape 11. Such apertures and groups of discontinuous slits are spaced longitudinally of the tape 11 to provide a number of such frames of material. If the apertures 15 are not provided in tape 11 then the frames 17 take the form of small sheets of pressure-sensitive material.

The kraft paper tape 12 is a commercially available paper known by this name and is provided with apertures 20 which are spaced longitudinally thereof. Apertures 20 are preferably of a size at least equal to the area defined by the outer edges of the discontinuous slits 16 in tape 11. When the tapes 11 and 12 are joined or laminated together, the apertures 20 in tape 12 are in registry with the apertures 15 or the areas defined by the discontinuous slits 16 in tape 11. The kraft paper tape 12 is preferably of a width greater than the tape 11 and each area (frame or sheet 17) defined by the discontinuous slits 16 in tape 11 is supported over an aperture 20 in tape 12 by the bridges 18 of pressure-sensitive material.

The glassine paper tape 13 is preferably of a width equal to that of the tape 11 and is provided with apertures 25 which are spaced longitudinally of the tape in accordance with the spacing of the apertures 15 in tape 11. A group of discontinuous slits 26 are spaced from and surround the aperture 25 to define frames 27 which are the same as the frames 17 in tape 11. Bridges 28 hold the frames 27 in relation to tape 13 in the same manner as bridges 18. If apertures 15 are omitted from tape 11 so slits 16 form a sheet of pressure-sensitive material, then the apertures 25 in tape 13 should also be omitted. Since tape 13 will not readily adhere to the pressure-sensitive adhesive on tape 11 and is peeled from the tape 10 before the sheets or frames 17 are cut, tape 13 need not be provided with either apertures 25 nor slits 26.

When tapes 11, 12, and 13 are joined as shown in FIG. 3 apertures 15, 20, and 25 will be in registry as well as the patterns of slits 16 and 26. Since the patterns formed by the discontinuous slits 16 in tape 11 and by slits 26 in tape 13 are identical, tape 13 serves as a protective cover for the adhesive surfaces of the frames or sheets 17 which are exposed in the apertures 20 of tape 12. Although grossly exaggerated, the relationship of the apertures, slits, and surfaces is substantially as shown in FIG. 3.

Since the glassine paper tape 13, or a similar material having an adhesive resistant agent on at least one surface thereof, can be peeled from the tape structure to fully expose the adhesive surface of tape 11 and is not adhesively secured to tape 12, this tape can be readily removed and permits the frame or sheet 17 to be carried and supported by means of tape 12 to a position in which the frame or sheet 17 is cut from tape 11. In order to provide a means for advancing the tape structure 10, perforations 30 can be provided in the edge of tape 12 between its edge and the edge of tape 11 and 13, shown in FIG. 1. Since the frame or sheet 17 is suspended over aperture 20 in tape 12, after removal of tape 13, each sheet or frame can be readily removed from tape 11 merely by cutting the bridges 18 with a clicking die or a similar cutting device. This can be accomplished in close proximity to the surface which is to receive the sheet or frame 17 without the need for any complicated vacuum device for moving the frame from the tape to the object. In instances where the pressure-sensitive material is to be applied to a relatively soft object such as a card, a frame or sheet 17 can be first applied to the card and the bridges of material 18 can then be cut to release the sheet or frame from the tape 11.

With reference particularly to FIG. 4 of the drawings a method is disclosed for forming the tape structure 10, as shown in FIG. 1. The tapes 11, 12, and 13 are withdrawn from their respective supply rolls 35, 36 and 37 and brought together in proper relation at the rolls 38 and 39, which press the pressure-sensitive material against tape 12 and the portion exposed within the aperture 20 of the tape 12 against the glassine tape 13. In this arrangement the tape 12 is die-cut to provide the apertures 20 at the position designated by the numeral 40 to provide a series of apertures spaced longitudinally of the tape. The perforations 30 can be punched at the same time as apertures 40 or a separate die 41 can be arranged ahead of die 40. In either case, perforations 30 can be used to advance tape 12 as well as to advance tape 10 into die 42. After the tapes are joined, the laminated tape 10 is then moved under a die designated by the numeral 42 so each aperture 20 in tape 12 is in registry with the die which then blanks out the apertures 15 and 25 and the slits 16 and 26 in the tapes 11 and 13 simultaneously. With this arrangement, it is necessary that aperture 20 in tape 12 be at least equal to and preferably slightly larger than the area defined by the outer edges of the discontinuous slits 16 and 26 in the tapes 11 and 13. Since the glassine paper tape 13 serves as a protective covering for the exposed adhesive surfaces of tape 11, the laminated tape can be wound into roll form without presenting any problem due to adherence of one convolution of tape 10 to another when it is unwound.

In FIG. 5 of the drawings an arrangement is disclosed wherein the apertures and discontinuous slits in the three tape elements 11, 12 and 13 are cut in the respective tapes before the tapes are joined together. The die 43 cuts the apertures 15 and discontinuous slits 16 in the tape 11 and at the same time the die 40 blanks the apertures 20 in tape 12 and the die 44 cuts the apertures 25 and discontinuous slits 26 in the tape 13. It can be readily appreciated that with this arrangement it is necessary that the dies 40, 43, and 44 be spaced exactly the same distance from the point at which the tapes are joined in order that the apertures 15, 20, and 25 are in exact registry. In this arrangement, as in the one described above with respect to FIG. 4, the perforator 41 is utilized to provide the perforations 30 in tape 12. The problem of registration is, of course, made simpler, if tape 13 is not die cut with apertures 25 and slits 26 but is merely a continuous tape.

While a specific embodiment of a laminated tape structure has been disclosed and described herein, it is to be understood that materials other than those described herein can be used to accomplish the same result. The glassine paper, for example, can be eliminated if the outer surface of the pressure-sensitive tape is coated with an adhesive resistant agent. With this arrangement, the tapes 11 and 12 can be wound into roll form and the adhesive surface of tape 11 exposed within the aperture 20 of tape 12 is then protected and can be readily released from the adhesive resistant agent carried by tape 11. Further, the apertures 15, 20 and 25 can be of any shape and need not necessarily be rectangular. As a matter of fact, the disposition and shape of slits 16 and 26 can be such as to define any regular or irregular shaped area. Since other changes and modifications will be apparent to those skilled in the art, after reading the above disclosure, the invention is not to be limited to the embodiments disclosed but is of a scope as defined by the appended claims.

Having now particularly described my invention, what I desire to secure by Letters Patent of the United States and what I claim is:

1. A laminated tape structure for supporting a plurality of removable areas formed in one of the tape lamina comprising a first tape having an adhesive on one surface thereof, said tape being provided with a seriate pattern of slits defining a plurality of longitudinally spaced areas, and a second tape contiguous to the adhesive surface of said first tape and provided with a plurality of longitudinally spaced apertures at least of the same size as, and generally of the same shape as said areas defined by said slits in said first tape, each of said removable areas of said first tape being supported in registry with one of said apertures in said second tape by the portions of said first tape between the slit defining each removable area.

2. A laminated tape structure in accordance with claim 1 wherein said first tape is a thin, transparent material having a pressure-sensitive adhesive on said one surface and an adhesive resistant agent on the other surface and said second tape is a paper at least equal in width to said first tape.

3. A laminated tape structure for supporting a plurality of removable areas formed in one of the tape lamina comprising a first tape having an adhesive on one surface thereof and provided with a seriate pattern of discontinuous slits defining a plurality of longitudinally spaced, removable areas, a second tape contiguous to the adhesive surface of said first tape and provided with a plurality of longitudinally spaced apertures in registry with and at least of the same size and shape as said areas in said first tape, and a third tape having an adhesive resistant agent on at least one surface thereof, the adhesive resistance surface being contiguous to said second tape and to the adhesive surface of said first tape exposed in said apertures in said second tape.

4. A laminated tape structure for supporting a plurality of removable areas formed in one of the tape lamina comprising a first tape having an adhesive on one surface thereof and provided with a seriate pattern of discontinuous slits, defining a plurality of longitudinally spaced, removable areas, a second tape contiguous to the adhesive surface of said first tape and provided with a plurality of longitudinally spaced apertures in registry with and at least of the same size and shape as said areas in said first tape, and a third tape having an adhesive resistant agent on at least one surface thereof and provided with a seriate pattern of discontinuous slits defining a plurality of longitudinally spaced areas of the same size and shape as those of said first tape, the adhesive resistant surface of said third tape being contiguous to said second tape with said areas of said third tape contiguous to and in registry with the areas of said first tape for protecting the adhesive surfaces of said first tape exposed in said apertures in said second tape.

5. A laminated tape structure for supporting a plurality of removable frames formed in one of the tape lamina comprising a first tape having an adhesive on one surface thereof and a plurality of removable rectangular frames formed therein and spaced longitudinally thereof, each of said removable frames being retained in relation with said first tape by bridges of the material of said first tape spaced and arranged around the periphery of each of said frames, a second tape contiguous to the adhesive surface of said first tape and provided with rectangular apertures spaced longitudinally thereof and in registry with and of at least the same size as said removable frames of said first tape, and a third tape having an adhesive resistant agent on at least one surface thereof and a plurality of rectangular frames formed therein and spaced longitudinally thereof, each of said frames in said third tape being of the same size as said removable frames of said first tape and retained in relation with said third tape by bridges of the material of said third tape spaced and arranged around the periphery of each of said frames, and the adhesive resistant surface of said third tape being contiguous to said second tape with said frames of said third tape contiguous to and in registry with said removable frames of said first tape for protecting the adhesive surface of said first tape exposed in said apertures in said second tape.

6. A laminated tape structure in accordance with claim 5 wherein each frame of said first tape and of said third tape is separated from its respective tape by a slit along opposite sides of each frame in one direction and is joined to its respective tape by bridges of material spaced along opposite sides of each frame in the other direction.

7. A laminated tape structure for supporting a plurality of removable areas formed in one of the tape lamina comprising a first tape having an adhesive on one surface thereof and provided with apertures spaced longitudinally thereof and with discontinuous slits spaced from and arranged around each of said apertures, a second tape contiguous to the adhesive surface of said first tape and provided with apertures spaced longitudinally thereof, said apertures in said second tape being in registry with and at least the same size and shape as the removable areas defined by said slits in said first tape, and a third tape having an adhesive resistant agent on at least one surface thereof, the adhesive resistant surface being contiguous to said second tape and to the adhesive surfaces of said first tape exposed in said apertures in said second tape.

8. A laminated tape structure for supporting a plurality of removable areas formed in one of the tape lamina comprising a first tape having an adhesive on one surface thereof and provided with apertures spaced longitudinally thereof and with discontinuous slits spaced from and arranged around each of said apertures, a second tape contiguous to the adhesive surface of said first tape and provided with apertures spaced longitudinally thereof, said apertures in said second tape being in registry with and at least the same size and shape as the removable areas defined by said slits in said first tape, and a third tape having an adhesive resistant agent on at least one surface thereof and provided with apertures spaced longitudinally thereof and with discontinuous slits spaced from and arranged around each of said apertures therein, said apertures and said slits in said third tape being the same as those in said first tape and the adhesive resistant surface of said third tape being contiguous to said second tape with the areas as defined by said slits in said third tape contiguous to and in registry with the areas as defined by said slits in said first tape for protecting the adhesive surfaces of said first tape exposed in said apertures in said second tape.

9. A laminated tape structure in accordance with claim 8 wherein said first tape is a thin, transparent material having a pressure-sensitive adhesive on said one surafce.

10. A laminated tape structure in accordance with claim 8 wherein said second tape is a paper for supporting said first tape when said third tape is removed.

11. A laminated tape structure in accordance with claim 8 wherein said third tape is a glassine paper.

References Cited by the Examiner
UNITED STATES PATENTS
2,552,664   5/51   Burdine _____ 154—53.5

EARL M. BERGERT, *Primary Examiner.*